US010533796B2

(12) United States Patent
Baxter et al.

(10) Patent No.: US 10,533,796 B2
(45) Date of Patent: Jan. 14, 2020

(54) METHOD FOR THICKENING A CRYOGENIC SLURRY USING A CROSS-FLOW FILTER

(71) Applicants: Larry Baxter, Orem, UT (US); Eric Mansfield, Spanish Fork, UT (US); Kyler Stitt, Lindon, UT (US); David Frankman, Provo, UT (US); Skyler Chamberlain, Provo, UT (US); Nathan Davis, Bountiful, UT (US); Stephanie Burt, Provo, UT (US); Steven Malone, Manti, UT (US)

(72) Inventors: Larry Baxter, Orem, UT (US); Eric Mansfield, Spanish Fork, UT (US); Kyler Stitt, Lindon, UT (US); David Frankman, Provo, UT (US); Skyler Chamberlain, Provo, UT (US); Nathan Davis, Bountiful, UT (US); Stephanie Burt, Provo, UT (US); Steven Malone, Manti, UT (US)

(*) Notice: Subject to any disclaimer, the term of this patent is extended or adjusted under 35 U.S.C. 154(b) by 104 days.

(21) Appl. No.: 15/454,479

(22) Filed: Mar. 9, 2017

(65) Prior Publication Data

US 2018/0257008 A1 Sep. 13, 2018

Related U.S. Application Data

(63) Continuation of application No. 15/454,353, filed on Mar. 9, 2017.

(51) Int. Cl.
*F25J 3/08* (2006.01)
*B01D 17/00* (2006.01)
(Continued)

(52) U.S. Cl.
CPC ........... *F25J 3/08* (2013.01); *B01D 17/00* (2013.01); *B01D 17/10* (2013.01); *B01D 25/215* (2013.01);
(Continued)

(58) Field of Classification Search
CPC ........ F25J 3/08; F25J 2205/84; F25J 2290/44; B01D 25/302; B01D 25/215; B01D 39/20; B01D 39/2075; B01D 39/1692
See application file for complete search history.

(56) References Cited

U.S. PATENT DOCUMENTS

| RE22,520 E * | 7/1944 | De Lisle | B01D 25/176 |
| | | | 134/33 |
| 2,364,366 A * | 12/1944 | Jahreis | B01D 25/215 |
| | | | 210/229 |

(Continued)

*Primary Examiner* — Liam Royce

(57) ABSTRACT

A method for thickening a cryogenic slurry is disclosed. The method comprises providing a cryogenic slurry flow path, a cryogenic liquid discharge path, and a filter medium between the cryogenic slurry flow path and the cryogenic liquid discharge path. The cryogenic slurry comprises a solid and a cryogenic liquid. The cryogenic slurry is fed into the cryogenic slurry flow path, generally tangential to the filter medium. This causes a portion of the cryogenic liquid to cross the filter medium into the cryogenic liquid discharge path as a cryogenic liquid discharge and the cryogenic slurry to thicken to produce a thickened slurry. The filter medium comprises a cryogenically-stable material such that adsorption of gases is inhibited, deposition of solids is prevented, and temperature-change induced expansion and contraction of the filter medium is optimized.

17 Claims, 10 Drawing Sheets

(51) Int. Cl.
*B01D 25/30* (2006.01)
*B01D 25/21* (2006.01)
*B01D 39/20* (2006.01)
*B01D 39/16* (2006.01)

(52) U.S. Cl.
CPC ........ *B01D 25/302* (2013.01); *B01D 39/1692* (2013.01); *B01D 39/20* (2013.01); *B01D 39/2075* (2013.01)

(56) References Cited

U.S. PATENT DOCUMENTS

| | | | | |
|---|---|---|---|---|
| 2,417,958 | A * | 3/1947 | Teale | B01D 25/26 210/136 |
| 3,316,725 | A * | 5/1967 | Wolcott | F25J 3/04157 62/645 |
| 3,398,834 | A * | 8/1968 | Nuttall | B01D 61/08 210/321.84 |
| 3,502,211 | A * | 3/1970 | Erbach | B01D 29/05 210/791 |
| 5,240,605 | A * | 8/1993 | Winzeler | B01D 63/082 210/228 |
| 5,677,031 | A * | 10/1997 | Allan | B01D 39/1661 210/503 |
| 5,681,464 | A * | 10/1997 | Larsson | B01D 63/084 210/231 |
| 5,749,232 | A * | 5/1998 | Sauer | A61L 2/022 422/28 |
| 6,312,591 | B1 * | 11/2001 | Vassarotti | B01D 61/18 210/195.2 |

* cited by examiner

METHOD FOR THICKENING A CRYOGENIC SLURRY USING A CROSS-FLOW FILTER

CROSS-REFERENCE TO RELATED APPLICATION

This application is a continuation of U.S. patent application Ser. No. 15/454,353, filed Mar. 9, 2017.

FIELD OF THE INVENTION

This invention relates generally to the field of cross-flow filtration. More particularly, we are interested in thickening cryogenic slurries.

BACKGROUND

The removal of carbon dioxide, other acid gases, and contaminants from flue gas, syngas, and other gas streams is often accomplished by desublimation into cryogenic liquids, resulting in a cryogenic slurry. The ability to separate these and other cryogenic solids from a cryogenic liquid is of critical importance to greenhouse gas mitigation efforts. However, most separation technologies are ineffective, inefficient, expensive, or all three.

Cross-flow filtration, sometimes referred to as tangential filtration, is a common method for removing solids in reverse osmosis, nanofiltration, ultrafiltration, and microfiltration. Most modern applications are in biotechnology, wastewater treatment, and mineral processing. Common filter media include various textiles, cellulose, room-temperature and elevated-temperature ceramics, and sand. The ceramics used are not suitable for cryogenics. Filter media still tends to collect solids over time unless a filter media is selected on which the solids do not easily adsorb. Solids to be filtered are sent to laboratories where large numbers of filter media are tested until the ideal filter media is found. While there are filter media intended for dead-end style filters, no filter media available commercially is intended for or tested for cross-flow filtration of cryogenic temperature solids, such as acid gas solids.

A method and apparatus capable of overcoming these and other obstacles is needed for cryogenic solid-liquid separations.

U.S. Pat. No. 5,749,232 to Sauer teaches an apparatus and method for producing and injecting sterile cryogenic liquids. The cryogenic liquids are filtered through a dead-end style filter that filters and retains microbes from the liquid using sintered ceramic material filters. The present disclosure differs from this disclosure in that the filter media retains foulants rather than removing them, and therefore has to be shut down to clean or replace the filter media. This disclosure is pertinent and may benefit from the methods disclosed herein and is hereby incorporated for reference in its entirety for all that it teaches.

U.S. Pat. No. 2,364,366 to Jahreis teaches fractional removal of liquids from liquid-solid suspensions. Most prior art in this disclosure relies on the teachings of this publication for the basic design or method of their disclosures. This publication discusses the idea of passing a slurry through a channel tangential to the surface of a filter cloth to provide fractional removal of liquids from the slurry. The present disclosure differs from this disclosure in that this disclosure makes no accommodations for removing liquids from a cryogenic slurry. This disclosure utilizes wood and metal plates, which are not suitable for cryogenic slurries. This disclosure is pertinent and may benefit from the methods disclosed herein and is hereby incorporated for reference in its entirety for all that it teaches.

U.S. Pat. No. 2,417,958 to Teale teaches an apparatus for reducing the fluid content of a fluid-solid intermixture. This disclosure teaches the same concepts as the first prior art, above, with modified, horizontal plates. The present disclosure differs from this disclosure in that this disclosure makes no accommodations for removing liquids from a cryogenic slurry. This disclosure provides only for "non-rigid" or "pliable" materials, and does not anticipate the need for materials that could handle extremely low temperatures. This disclosure is pertinent and may benefit from the methods disclosed herein and is hereby incorporated for reference in its entirety for all that it teaches.

U.S. Pat. No. 3,502,211 to Von Polnitz et al. teaches a process and apparatus for recovering solids in enriched and purified form. This disclosure teaches the same concepts as the first prior art, above, with modified plates and a reversible flow for filter media cleaning. The present disclosure differs from this disclosure in that this disclosure makes no accommodations for removing liquids from a cryogenic slurry, making no disclosure as to what materials with which to construct the apparatus. This disclosure is pertinent and may benefit from the methods disclosed herein and is hereby incorporated for reference in its entirety for all that it teaches.

U.S. Pat. No. 5,240,605 to Winzeler teaches a spiral filter for removal of aerosols, gaseous and liquid suspensions, and colloidal or true solutions. This disclosure teaches the same concepts as the first prior art, above, with round plates and the ability to filter gas phase suspensions. The present disclosure differs from this disclosure in that this disclosure teaches methods of handling ambient or similar temperature gases, and not cryogenic liquids. This disclosure is pertinent and may benefit from the methods disclosed herein and is hereby incorporated for reference in its entirety for all that it teaches.

U.S. Pat. No. 6,312,591 to Vassarotti teaches a spiral filter for removal of aerosols, gaseous and liquid suspensions, and colloidal or true solutions. This disclosure teaches the same concepts as the first prior art, above, with round plates and the ability to filter gas phase suspensions. The present disclosure differs from this disclosure in that this disclosure teaches methods of handling ambient or similar temperature gases, and not cryogenic liquids. This disclosure is pertinent and may benefit from the methods disclosed herein and is hereby incorporated for reference in its entirety for all that it teaches.

U.S. Pat. No. 3,398,834 to Nuttall et al. teaches an apparatus for reverse osmosis water purification. The present disclosure differs from this disclosure in that this disclosure utilizes reverse osmosis. This disclosure is pertinent and may benefit from the methods disclosed herein and is hereby incorporated for reference in its entirety for all that it teaches.

SUMMARY

A method for thickening a cryogenic slurry is disclosed. The method comprises providing a cryogenic slurry flow path, a cryogenic liquid discharge path, and a filter medium between the cryogenic slurry flow path and the cryogenic liquid discharge path. The cryogenic slurry comprises a solid and a cryogenic liquid. The cryogenic slurry is fed into the cryogenic slurry flow path, generally tangential to the filter medium. This causes a portion of the cryogenic liquid to cross the filter medium into the cryogenic liquid discharge path as a cryogenic liquid discharge and the cryogenic slurry to thicken to produce a thickened slurry. The filter medium comprises a cryogenically-stable material such that adsorption of gases is inhibited, deposition of solids is prevented, and temperature-change induced expansion and contraction of the filter medium is optimized.

The cryogenically-stable material may comprise sintered ceramics, polytetrafluoroethylene, polychlorotrifluoroethylene, natural diamond, man-made diamond, chemical-vapor deposition diamond, polycrystalline diamond, or combinations thereof.

The filter medium may comprise a hole with a diameter of at most 25 microns, or a sparger with openings comprising an effective diameter of at most 25 microns.

A portion of the cryogenic slurry flow path and a portion of the liquid discharge path may be enclosed perpendicular to the cryogenic slurry flow path and the liquid discharge path by the cryogenically-stable material.

The solid may comprise carbon dioxide, nitrogen oxide, sulfur dioxide, nitrogen dioxide, sulfur trioxide, hydrogen sulfide, hydrogen cyanide, water, hydrocarbons with a freezing point above the temperature of the cryogenic liquid, or combinations thereof. The cryogenic liquid may comprise any compound or mixture of compounds with a freezing point below the temperature at which the solid melts.

Optimization of the expansion and contraction may comprise reducing expansion and contraction of the filter medium to prevent damage to the filter medium. Optimization may comprise increasing expansion and contraction of the filter medium, causing the filter medium to become self-cleaning, the movement removing foulant from the filter medium.

The cryogenic slurry flow path may be provided with a back pressure by a restricted outlet for the thickened slurry.

The method may comprise providing a double-walled pipe comprising an inner pipe and an outer pipe separated by a liquid plenum. A space inside the inner pipe may define the cryogenic slurry flow path. The inner pipe may comprise cylindrical side walls forming the filter medium, being perforated by at least one hole with a diameter of less than 25 microns. The liquid plenum between the outer pipe and the inner pipe may define the cryogenic liquid discharge path. The cryogenic slurry may be provided to the cryogenic slurry flow path and thickened to produce the thickened slurry and the cryogenic liquid discharge. The cryogenic liquid discharge may be removed through the cylindrical side walls and passed through the liquid plenum. The thickened slurry may be removed through an outlet of the inner pipe. The double-walled pipe may define a generally spiral flow pattern, or a u-tube bundle pattern.

The method may comprise providing a head plate, a slurry plate, an end plate, and the filter medium, the filter medium further comprising a first filter plate and a second filter plate. The first filter plate may be secured between the head plate and a first face of the slurry plate, with the second filter plate secured between a second face of the slurry plate and the end plate. The cryogenic slurry flow path may pass through the head plate and the slurry plate into the end plate, connecting to a thickened slurry flow path in the end plate. The thickened slurry flow path may leave the end plate and pass through the slurry plate and the head plate. The cryogenic liquid discharge path may begin in the end plate in an end plate liquid removal chamber and pass through the slurry plate and the head plate, with additional cryogenic liquid provided to the liquid discharge path in the head plate by a head plate liquid removal chamber. The cryogenic slurry flow path in the slurry plate may comprise generally spiraling paths on the first face of the slurry plate and the second face of the slurry plate, wherein the cryogenic slurry flow path is shaped generally like a half-pipe, with an open face of the half-pipe facing the first filter plate and the second filter plate. The head plate may comprise a raised lip to insert the first filter plate such that an open space is provided between the first filter plate and the head plate, the open space defining the head plate liquid removal chamber. The end plate may comprise a raised lip to insert the second filter plate such that an open space is provided between the second filter plate and the end plate, the open space defining the end plate liquid removal chamber. The slurry plate may comprise a central portion with the generally spiraling paths, the central portion rimmed with a narrower outside portion. The head plate and the end plate may be shaped in a manner that they will fit over the central portion of the slurry plate, causing the combination of the head plate, the slurry plate, the end plate, the first filter plate, and the second filter plate to form a right rectangular prism. The cryogenic slurry may pass through the central portion of the slurry plate generally tangential to the first filter plate and the second filter plate, causing the cryogenic liquid to pass into the head plate liquid removal chamber and the end plate liquid removal chamber and the thickened cryogenic slurry to pass through the thickened slurry flow path. The half-pipe of the slurry plates may comprise a diameter that varies to provide consistent pressure.

The method may comprise providing a head plate, an even number of slurry plates, one fewer liquid removal plates than the total number of slurry plates, an end plate, and the filter medium, the filter medium comprising a filter plate for each face of each slurry plate, the filter plate for the head plate being a first filter plate, the filter plate for the end plate being a last filter plate, and the filter plates for use between the slurry plates and the liquid removal plates being middle filter plates. The first filter plate may be secured between the head plate and a first face of a first slurry plate. The last filter plate may be secured between the end plate and a second face of a last slurry plate. The middle filter plates may be secured between the liquid removal plates and the slurry plates. The cryogenic slurry flow path may pass through the head plate, the slurry plates, and the liquid removal plates into the end plate, connecting to a thickened slurry flow path in the end plate. The thickened slurry flow path may leave the end plate and pass through the slurry plates, the liquid removal plates, and the head plate. The cryogenic liquid discharge path may begin in the end plate in an end plate liquid removal chamber and pass through the slurry plates, the liquid removal plates, and the head plate, with additional cryogenic liquid provided to the liquid discharge path from the liquid removal plates by two liquid removal chambers for each of the liquid removal plates, and from the head plate by a head plate liquid removal chamber. The cryogenic slurry flow path in the slurry plates may comprise generally spiraling paths on the first face of the slurry plates and the second face of the slurry plates, wherein the cryogenic slurry flow path is shaped generally like a half-pipe, with the open face of the half-pipe facing the filter plates. The head plate may comprise a raised lip to insert the first filter plate such that an open space is provided between the first filter plate and the head plate, the open space defining the head plate liquid removal chamber. The end plate may comprise a raised lip to insert the last filter plate such that an open space is provided between the last filter plate and the end plate, the open space defining the end plate liquid removal chamber. The liquid removal plates may comprise a first face and a second face, each with a raised lip to insert the filter plates such that an open space is provided between the filter plates and the liquid removal plates, the open spaces comprising the middle liquid removal chambers. The slurry plates may comprise a central portion with the generally spiraling paths, the central portion rimmed with a narrower outside portion. The head plate, the end plate, and the liquid removal plates may be shaped in a manner that they will fit over the central portion of the slurry plates, causing the combination of the head plate, the slurry plates, the liquid removal plates, the end plate, and the filter plates to form a right rectangular prism. The cryogenic slurry may pass through the central portion of the slurry plates generally tangential to the filter plates, causing the cryogenic liquid to pass into the head plate liquid removal chamber, the end plate liquid removal chamber, and the middle liquid removal chambers, and the thickened cryogenic slurry to pass through the thickened slurry flow path. The half-pipe of the slurry plates may comprise a diameter that varies to provide consistent pressure.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
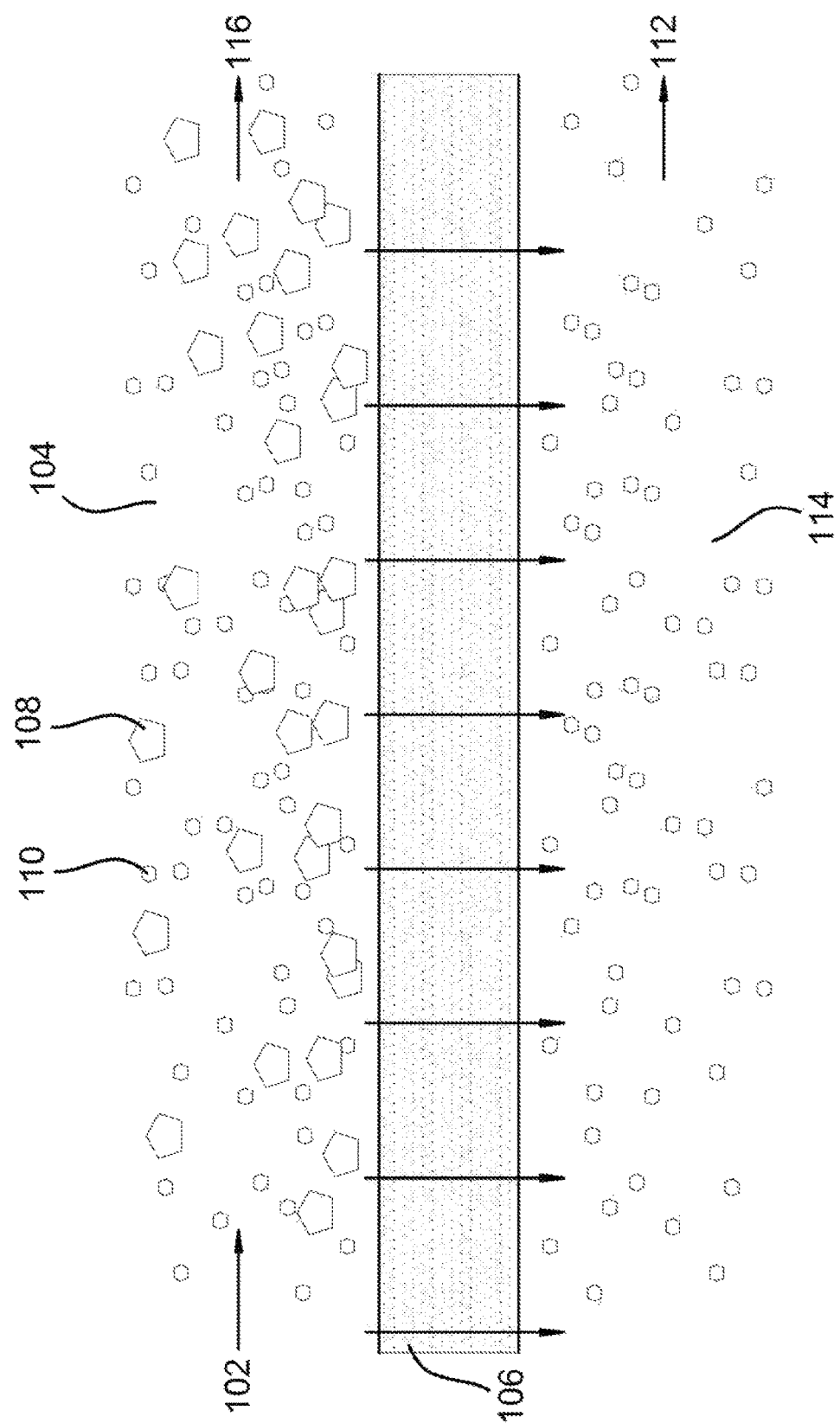
FIG. 1 shows a process flow diagram as per one embodiment of the present invention.

Referring to FIG. 1, a process flow diagram is shown at 100, as per one embodiment of the present invention. Cryogenic slurry 102 enters cryogenic slurry flow path 104, passing generally tangentially across filter medium 106. Cryogenic slurry 102 comprises solid 108 and cryogenic liquid 110. A portion of cryogenic liquid 110 crosses filter medium 106 to form cryogenic liquid discharge 112, which enters cryogenic liquid discharge path 114. Cryogenic slurry 102 is thereby thickened to produce thickened slurry 116. Filter medium 104 comprises a cryogenically-stable material. Cryogenically-stable materials inhibit adsorption of gases, prevent deposition of solids, and optimize temperature-change induced expansion and contraction of the filter medium. In some embodiments, optimization may include reducing expansion and contraction of the filter medium. In other embodiments, optimization may include increasing expansion and contraction of the filter medium, causing the filter medium to become self-cleaning, the movement removing foulant from the filter medium.

Figure 2A:
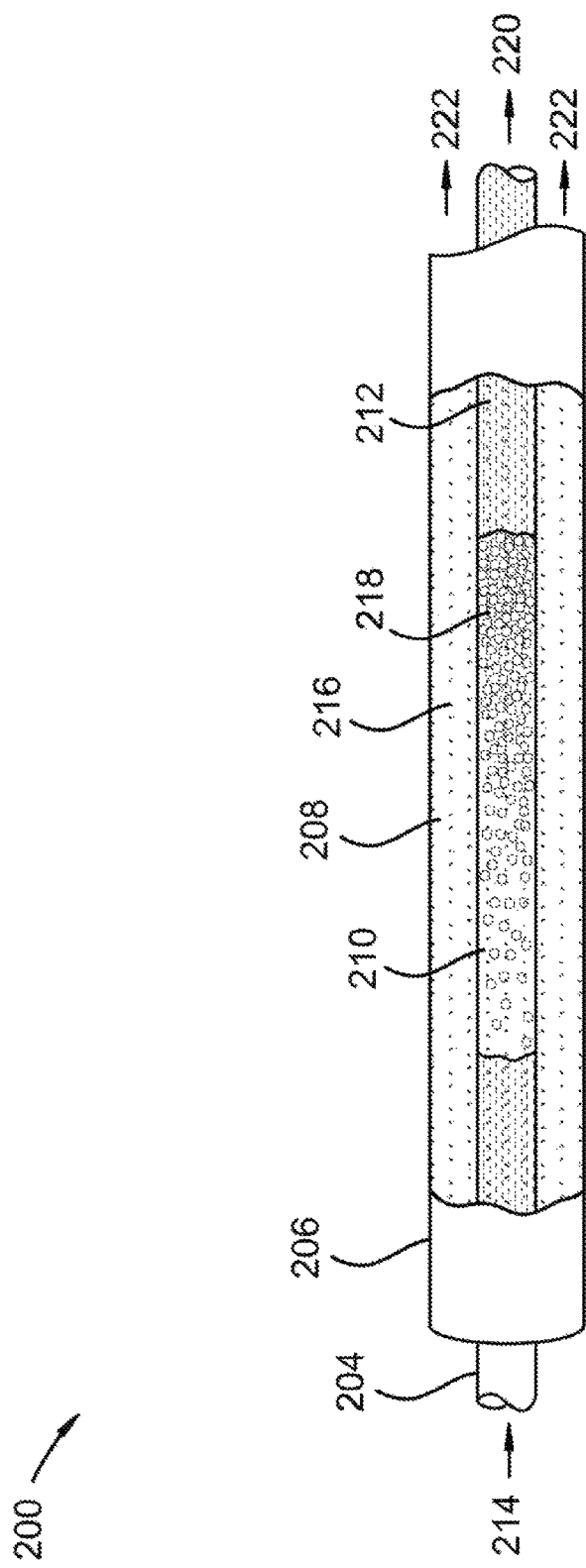
FIGS. 2A-B show an isometric cross-sectional view of a double-walled pipe cross-flow filter and a cross-section of the double-walled pipe.
Figure 2B:
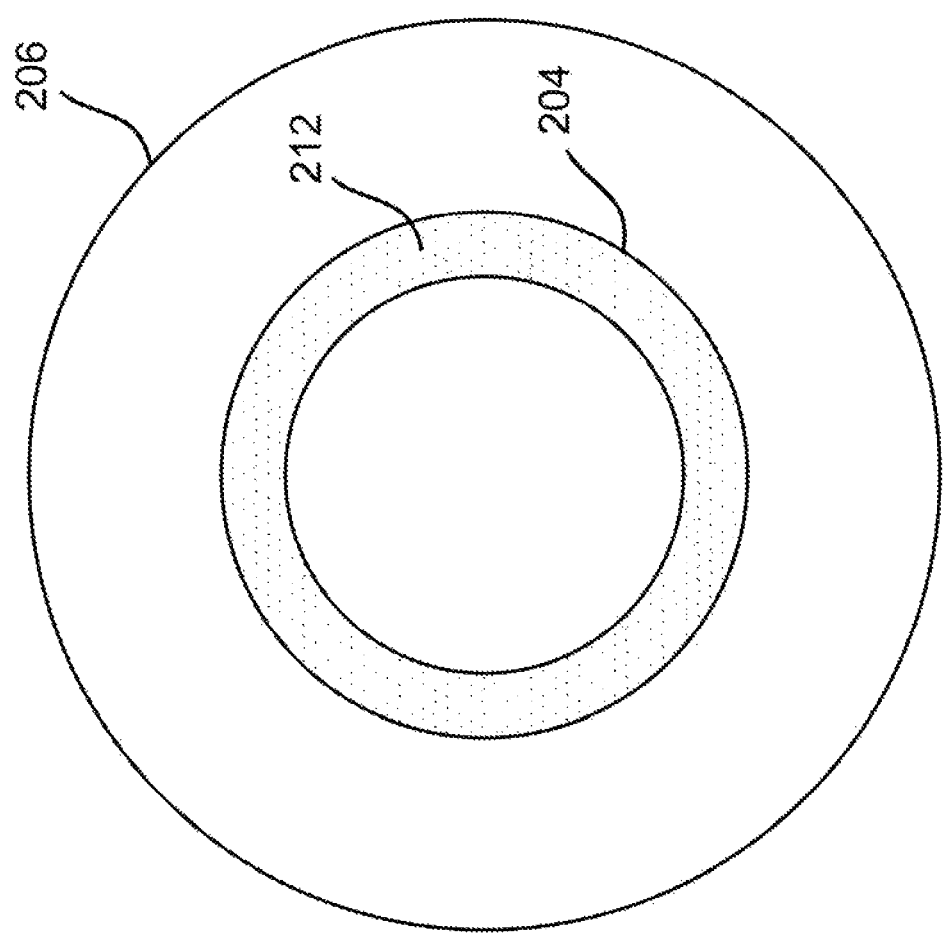

Referring to FIGS. 2A-B, an isometric cross-sectional view of a double-walled pipe cross-flow filter is shown at 200, with a cross-section of the double-walled pipe shown at 202, for use in the disclosed method, as per one embodiment of the present invention. The double-walled pipe cross-flow filter comprises inner pipe 204 and outer pipe 206, with a liquid plenum between them, the liquid plenum defining cryogenic liquid discharge path 208. The space inside the inner pipe defines cryogenic slurry flow path 210. Inner pipe 204 has cylindrical walls that form filter medium 212. Filter medium 212 is perforated by at least one hole of less than 25 microns. Cryogenic slurry 214, comprising cryogenic liquid 216 and solid 218, is provided to cryogenic slurry flow path 210 and is thickened to produce thickened slurry 220 by removal of the cryogenic liquid through filter medium 212, producing cryogenic liquid discharge 222. In some embodiments, the double-walled pipe defines a generally spiral flow pattern. In other embodiments, the double-walled pipe defines a u-tube bundle pattern. In some embodiments, cryogenic slurry flow path 210 and cryogenic liquid discharge path 208 are switched. In some embodiments, inner pipe 204 forms a spiral or u-tube bundle pattern inside of outer pipe 206.

Figure 3A:
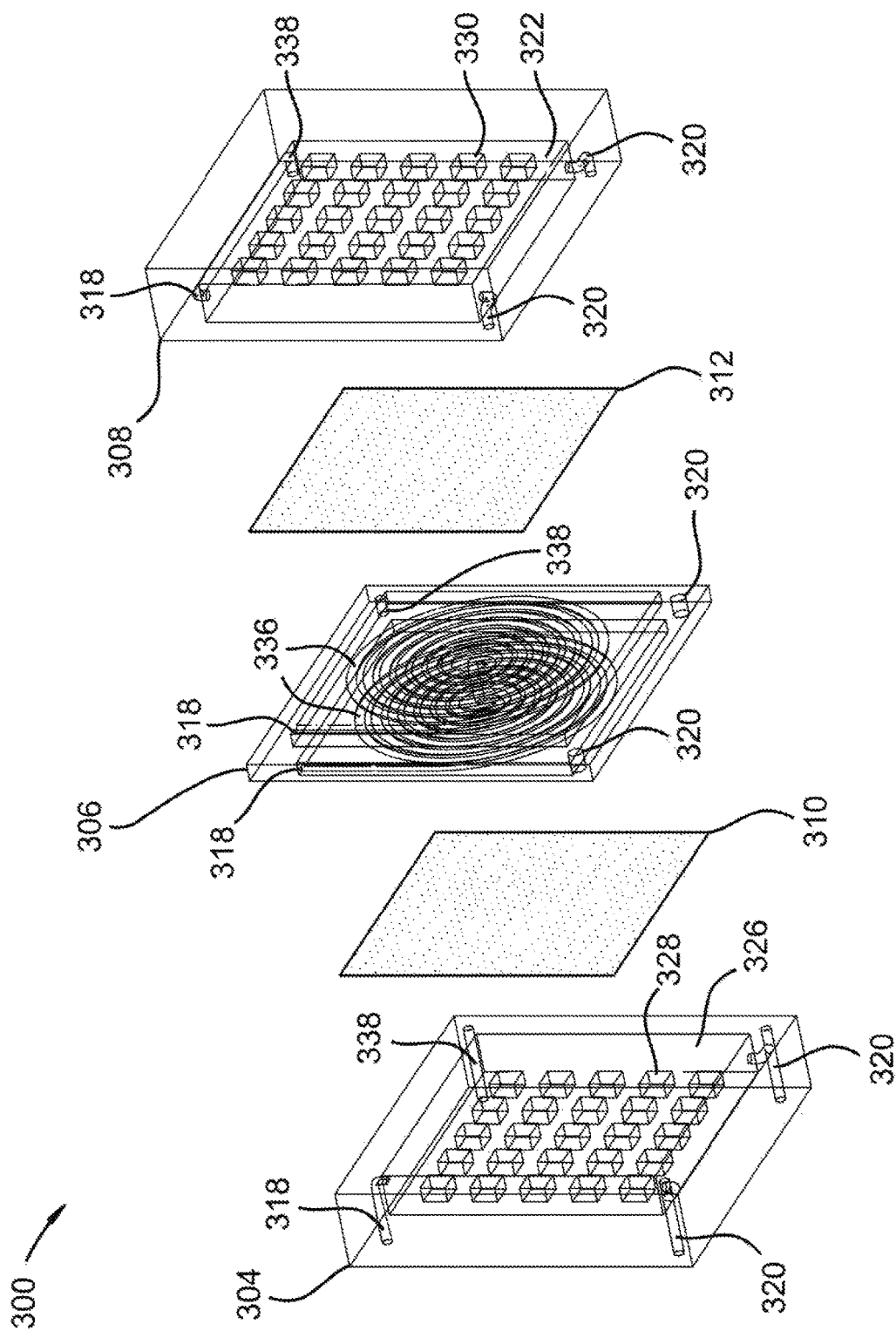
FIGS. 3A-C show isometric views of a cross-flow filter device, both disassembled and assembled.
Figure 3B:
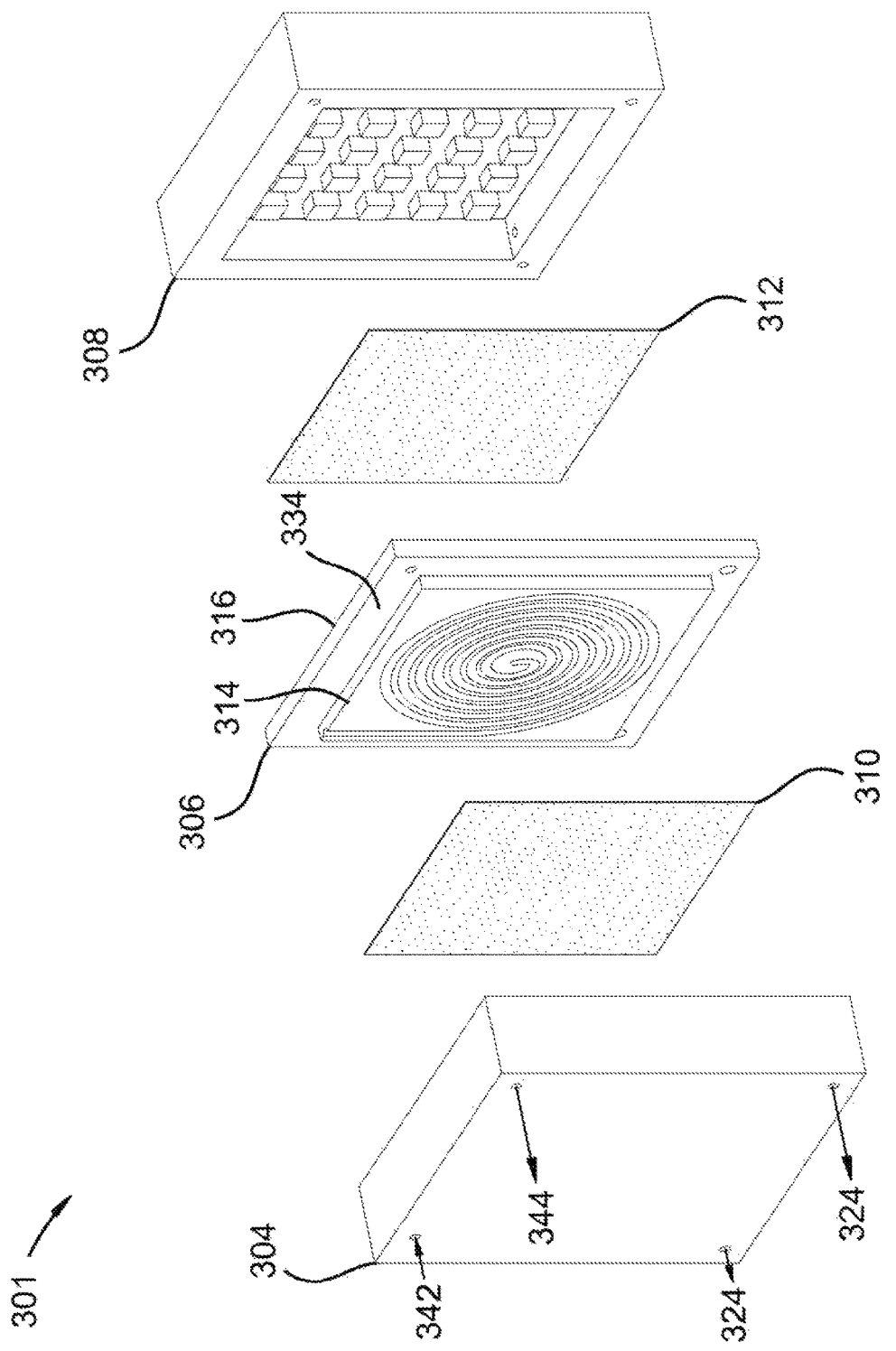
Figure 3C:
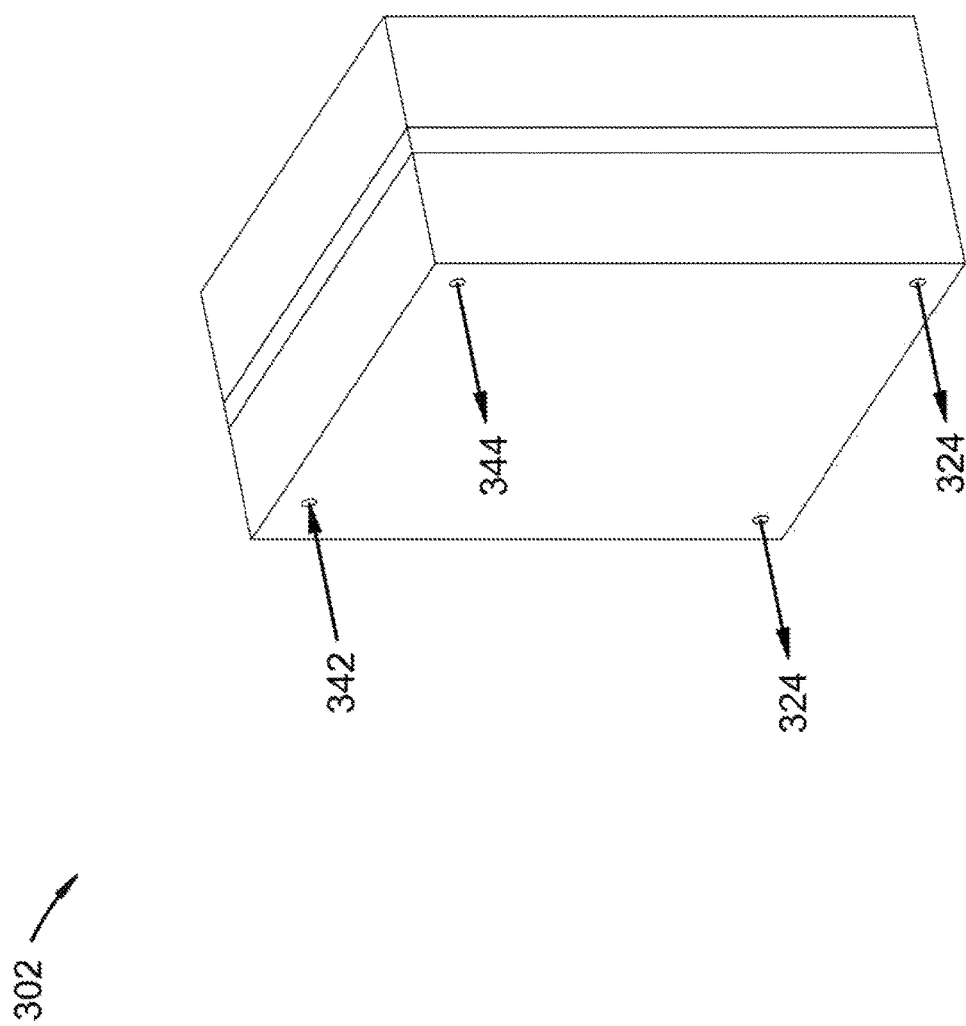

Referring to FIGS. 3A-C, isometric views of a cross-flow filter device are shown, disassembled wire mesh at 300, disassembled external at 301 and assembled external at 302, for use in the disclosed method, as per one embodiment of the present invention. The device comprises head plate 304, slurry plate 306, end plate 308, and a filter medium, the filter medium further comprising first filter plate 310 and second filter plate 312. First filter plate 310 is secured between head plate 304 and first face 314 of slurry plate 306. Second filter plate 312 is secured between second face 316 of slurry plate 306 and end plate 308. Cryogenic slurry flow path 318 passes through head plate 304 and slurry plate 306 into end plate 308, connecting to thickened slurry flow path 338 in end plate 308. Thickened slurry flow path 338 leaves end plate 308 and passes through slurry plate 306 and head plate 304. Cryogenic liquid discharge path 320 begins in end plate 308 in end plate liquid removal chamber 322 and passes through slurry plate 306 and head plate 304, with additional cryogenic liquid 324 provided to cryogenic liquid discharge path 320 in head plate 304 by head plate liquid removal chamber 326. Cryogenic slurry flow path 318 in the slurry plate comprises generally spiraling paths 336 on first face 314 of slurry plate 306 and second face 316 of slurry plate 306, wherein cryogenic slurry flow path 318 is shaped generally like a half-pipe, with an open face of the half-pipe facing first filter plate 310 and second filter plate 312. Head plate 304 comprises raised lip 328 to insert first filter plate 310 such that an open space is provided between first filter plate 310 and head plate 304, the open space defining head plate liquid removal chamber 326. End plate 308 comprises raised lip 330 to insert second filter plate 312 such that an open space is provided between second filter plate 312 and end plate 308, the open space defining end plate liquid removal chamber 332. Slurry plate 306 comprises central portion 334 with generally spiraling paths 336, central portion 334 rimmed with narrower outside portion 340. Head plate 304 and end plate 308 are shaped in a manner that they will fit over central portion 334 of slurry plate 306, causing the combination of head plate 304, slurry plate 306, end plate 308, first filter plate 310, and second filter plate 312 to form a right rectangular prism. Cryogenic slurry 342 passes through central portion 334 of slurry plate 306 generally tangential to first filter plate 310 and second filter plate 312, causing cryogenic liquid 324 to pass into head plate liquid removal chamber 326 and end plate liquid removal chamber 332 and thickened cryogenic slurry 344 to pass through thickened slurry flow path 338.

Figure 4A:
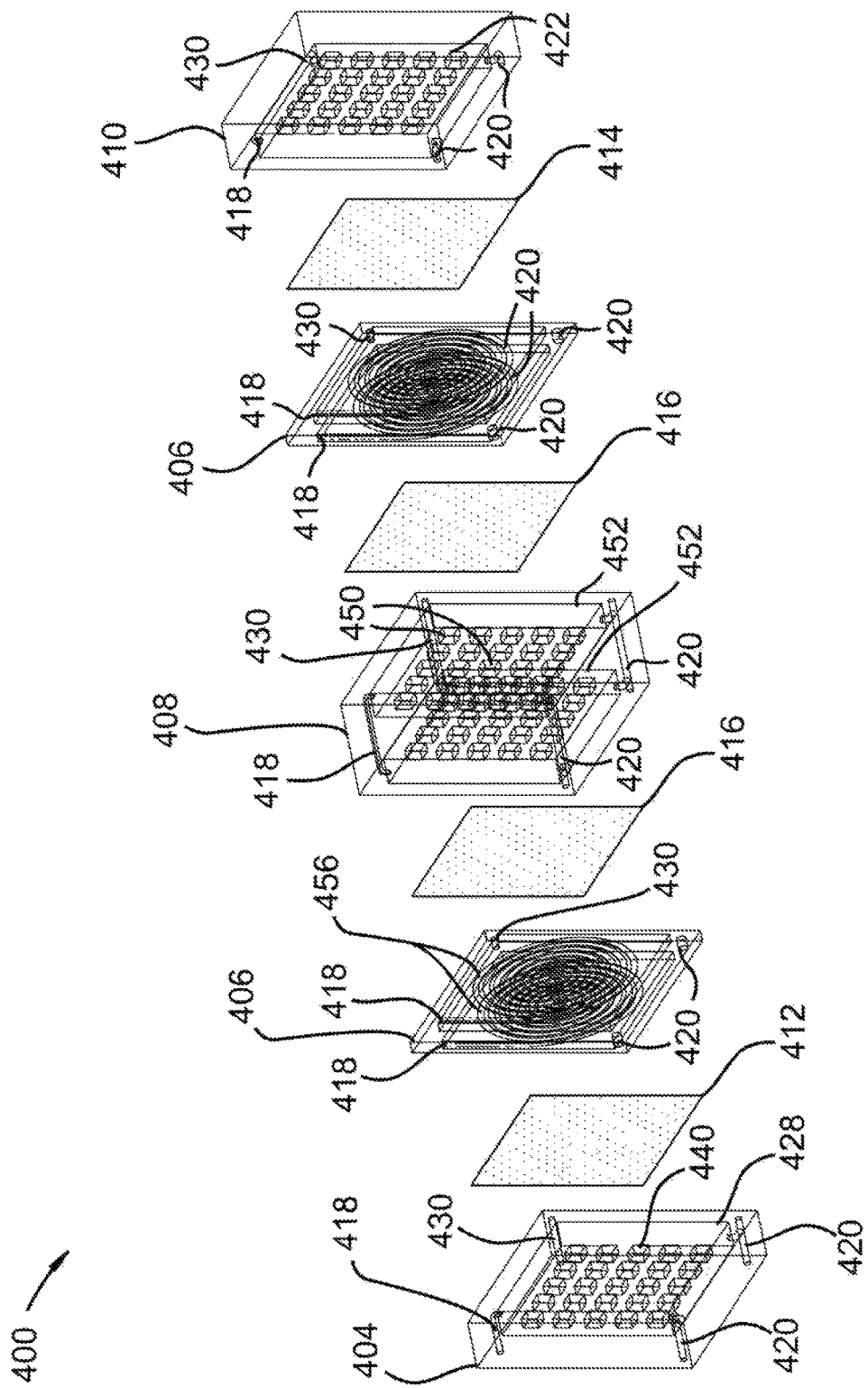
FIGS. 4A-C show isometric views of a cross-flow filter device, both disassembled and assembled.
Figure 4B:
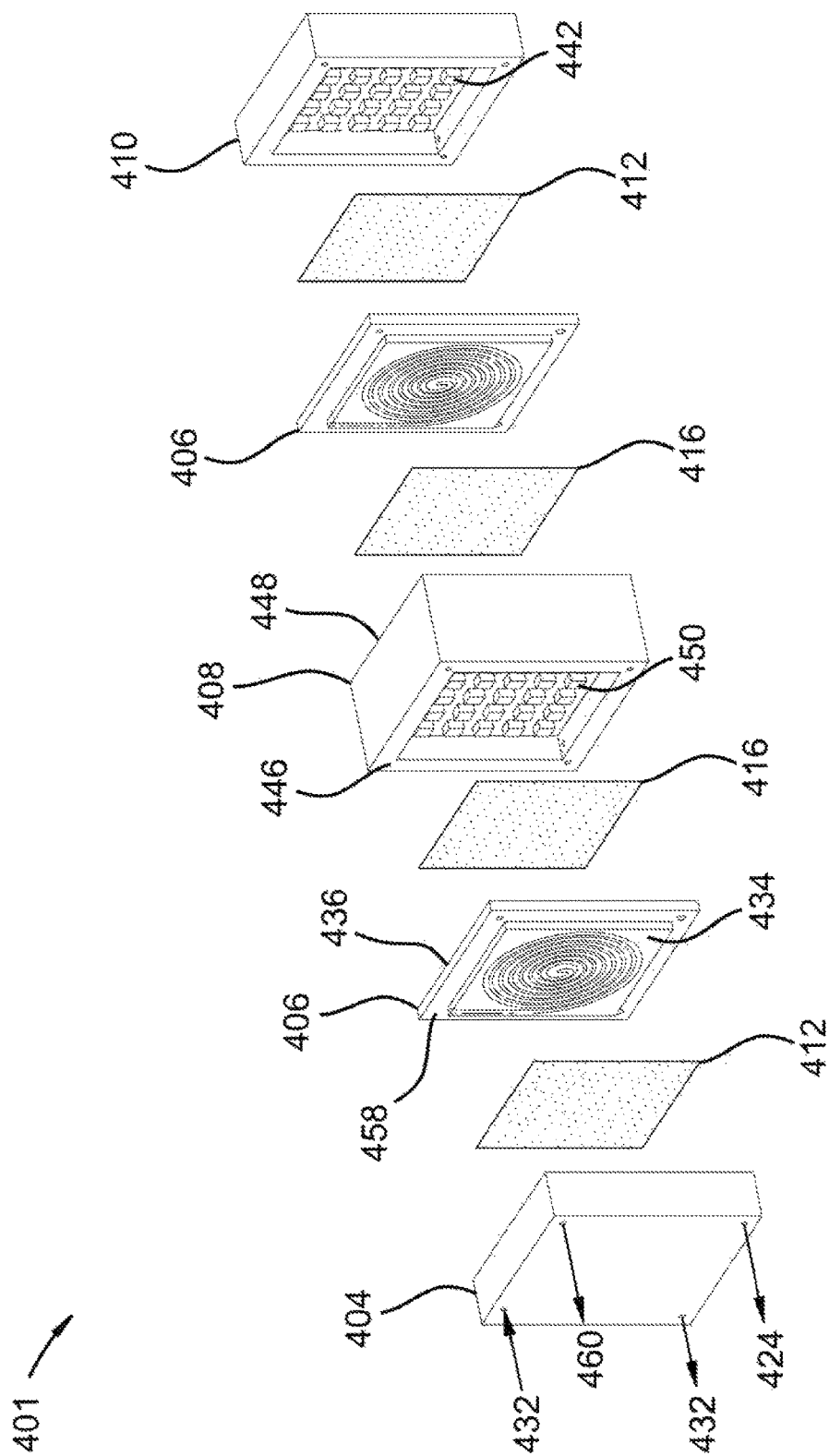
Figure 4C:
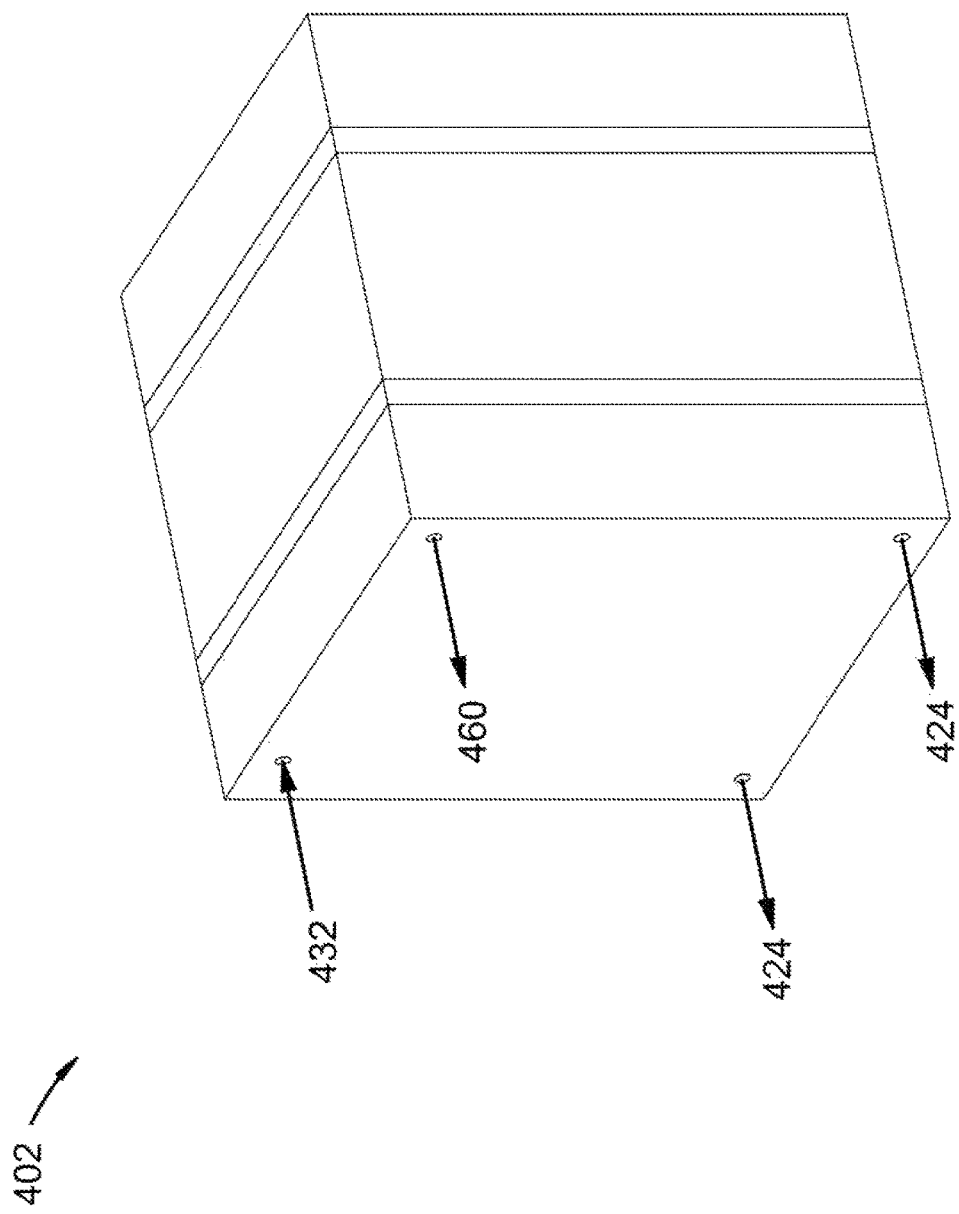

Referring to FIGS. 4A-C, isometric views of a cross-flow filter device are shown, disassembled wire mesh at 400, disassembled external at 401, and assembled external at 402, for use in the disclosed method, as per one embodiment of the present invention. The device comprises head plate 404, an even number of slurry plates 406, one fewer liquid removal plates 408 than the total number of slurry plates 406, an end plate 410, and the filter medium. The filter medium comprises a filter plate for each face of each slurry plate 406, the filter plate for the head plate being first filter plate 412, the filter plate for the end plate being last filter plate 414, and the filter plates for use between slurry plates 406 and liquid removal plates 408 being middle filter plates 416. First filter plate 412 is secured between head plate 404 and a first slurry plate 406. Last filter plate 414 is secured between end plate 410 and a last slurry plate 406. Middle filter plates 416 are secured between liquid removal plates 408 and slurry plates 406. Cryogenic slurry flow path 418 passes through head plate 404, slurry plates 406, and liquid removal plates 408 into end plate 410, connecting to thickened slurry flow path 430 in end plate 410. Thickened slurry flow path 430 leaves end plate 410 and passes through slurry plates 406, liquid removal plates 408, and head plate 404. Cryogenic liquid discharge path 420 begins in end plate 410 in end plate liquid removal chamber 422 and passes through slurry plates 406, liquid removal plates 408, and head plate 404, with additional cryogenic liquid 424 provided to cryogenic liquid discharge path 420 from liquid removal plates 408 by two liquid removal chambers 426 for each of liquid removal plates 408, and from head plate 404 by head plate liquid removal chamber 428. Cryogenic slurry flow path 418 in slurry plates 406 comprises generally spiraling paths 456 on first face 434 of slurry plates 406 and second face 436 of slurry plates 406, wherein cryogenic slurry flow path 418 is shaped generally like a half-pipe, with the open face of the half-pipe facing the filter plates. Head plate 404 comprises raised lip 438 to insert first filter plate 412 such that an open space is provided between the first filter plate and the head plate, the open space defining head plate liquid removal chamber 440. End plate 410 comprises raised lip 442 to insert last filter plate 414 such that an open space is provided between last filter plate 412 and end plate 410, the open space defining end plate liquid removal chamber 444. Liquid removal plates 408 comprise first face 446 and second face 448, each with raised lip 450 to insert middle filter plates 416 such that an open space is provided between middle filter plates 416 and liquid removal plates 408, the open spaces comprising middle liquid removal chambers 452. Slurry plates 406 comprise central portion 454 with generally spiraling paths 456, central portion 454 rimmed with narrower outside portion 458. Head plate 404, end plate 410, and liquid removal plates 408 shaped in a manner that they will fit over central portion 454 of slurry plates 406, causing the combination of head plate 404, slurry plates 406, liquid removal plates 408, end plate 410, and the filter plates to form a right rectangular prism. Cryogenic slurry 432 passes through central portion 454 of slurry plates 406 generally tangential to the filter plates, causing cryogenic liquid 424 to pass into head plate liquid removal chamber 440, end plate liquid removal chamber 444, and middle liquid removal chambers 452, and thickened cryogenic slurry 460 to pass through thickened slurry flow path 430.

Figure 5:
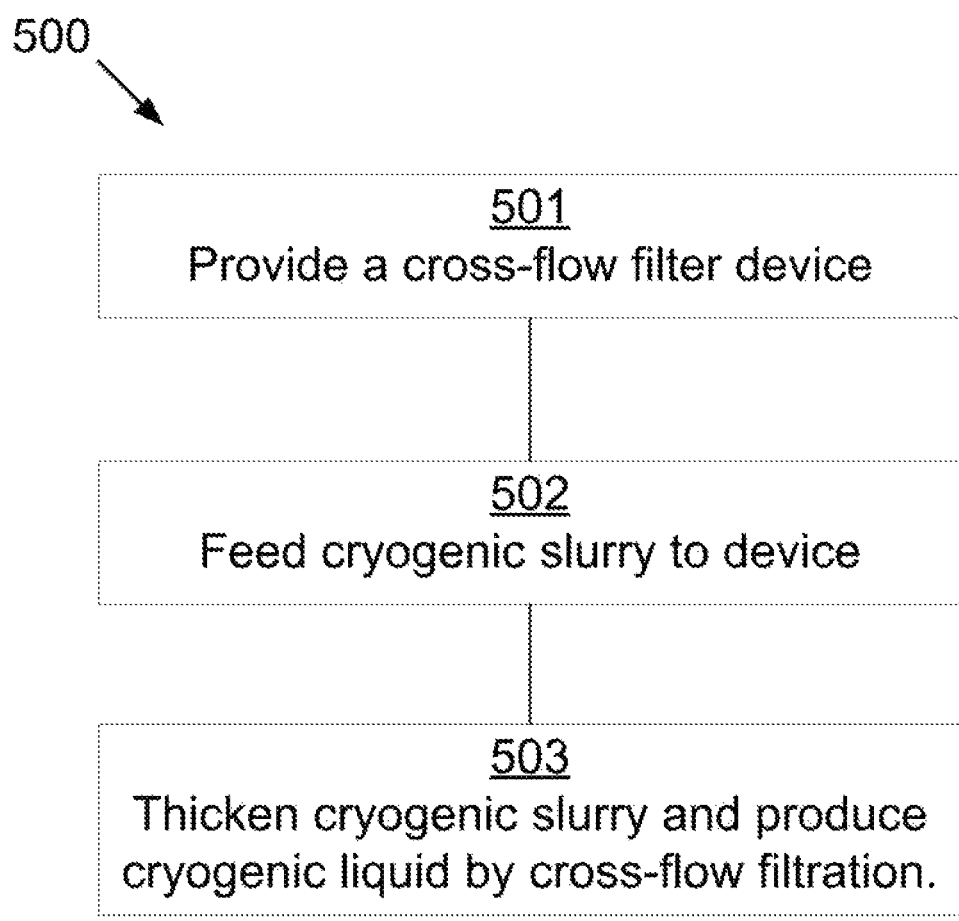
FIG. 5 shows a method for cross-flow filtration.

Referring to FIG. 5, a method for thickening a cryogenic slurry through a cross-flow filter device is shown at 500, as per one embodiment of the present invention. A cross-flow filter device is provided comprising a cryogenic slurry flow path, a cryogenic liquid discharge path, and a filter medium between the cryogenic slurry flow path and the cryogenic liquid discharge path, wherein the filter medium comprises a cryogenically-stable material such that adsorption of gases is inhibited, deposition of solids is prevented, and temperature-change induced expansion and contraction of the filter medium is optimized 501. A cryogenic slurry is fed to the cryogenic slurry flow path, generally tangential to the filter medium 502. A portion of the cryogenic liquid crosses the filter medium into the cryogenic liquid discharge path as a cryogenic liquid discharge and the cryogenic slurry is thickened to produce a thickened slurry 503.

In some embodiments, head plate 304 is a single-face slurry plate in conjunction with a single filter plate and end plate 308. In other embodiments, end plate 308 is a single-face slurry plate in conjunction with a single filter plate and head plate 304. In some embodiments, the plates of FIGS. 3A-C and FIGS. 4A-C are all circular rather than square. In some embodiments, the spiral pattern of slurry plates 306/406 are replaced by a criss-cross pattern symmetric to the edges or at a 45 degree angle to one of the edges. In some embodiments, the right-rectangular prism is oriented horizontally. In others, the right-rectangular prism is oriented vertically. In some embodiments, the half-pipe of the slurry plates comprises a diameter that varies to provide consistent pressure.

In some embodiments, the filter medium comprises a hole with a diameter of at most 25 microns. In some embodiments, the filter medium comprises a sparger with openings comprising an effective diameter of at most 25 microns.

In some embodiments, a portion of the cryogenic slurry flow path and a portion of the liquid discharge path are enclosed perpendicular to the cryogenic slurry flow path and the liquid discharge path by the cryogenically-stable material. In some embodiments, the cryogenic liquid comprises any compound or mixture of compounds with a freezing point below the temperature at which the solid melts.

In some embodiments, the solid comprises carbon dioxide, nitrogen oxide, sulfur dioxide, nitrogen dioxide, sulfur trioxide, hydrogen sulfide, hydrogen cyanide, water, hydrocarbons with a freezing point above the temperature of the cryogenic liquid, or combinations thereof.

In some embodiments, cryogenically-stable materials comprise sintered ceramics, polytetrafluoroethylene, polychlorotrifluoroethylene, natural diamond, man-made diamond, chemical-vapor deposition diamond, polycrystalline diamond, or combinations thereof.

In some embodiments, the cryogenic slurry flow path is provided with a back pressure by a restricted outlet for the thickened slurry. The restricted outlet comprises a reduction in the inner pipe, a nozzle, an orifice plate, a valve, a turbine, or a combination thereof.

The invention claimed is:

1. A method for thickening a cryogenic slurry comprising:
providing a cryogenic slurry flow path, a cryogenic liquid discharge path, and a filter medium between the cryogenic slurry flow path and the cryogenic liquid discharge path, wherein the filter medium comprises a cryogenically-stable material such that adsorption of gases is inhibited, deposition of solids is prevented, and temperature-change induced expansion and contraction of the filter medium is optimized;

feeding the cryogenic slurry, comprising a solid and a cryogenic liquid, into the cryogenic slurry flow path, substantially tangential to the filter medium, causing a portion of the cryogenic liquid to cross the filter medium into the cryogenic liquid discharge path as a cryogenic liquid discharge and the cryogenic slurry to thicken to produce a thickened slurry;

providing a head plate, a slurry plate, an end plate, and the filter medium, the filter medium further comprising a first filter plate and a second filter plate;

securing the first filter plate between the head plate and a first face of the slurry plate;

securing the second filter plate between a second face of the slurry plate and the end plate;

causing the cryogenic slurry flow path to pass through the head plate and the slurry plate into the end plate, connecting to a thickened slurry flow path in the end plate;

causing the thickened slurry flow path to leave the end plate and to pass through the slurry plate and the head plate;

causing the cryogenic liquid discharge path to begin in the end plate in an end plate liquid removal chamber and to pass through the slurry plate and the head plate, with additional cryogenic liquid provided to the liquid discharge path in the head plate by a head plate liquid removal chamber;

causing the cryogenic slurry flow path in the slurry plate to comprise substantially spiraling paths on the first face of the slurry plate and the second face of the slurry plate, wherein the cryogenic slurry flow path is shaped substantially like a half-pipe, with an open face of the half-pipe facing the first filter plate and the second filter plate;

forming the head plate to comprise a raised lip to insert the first filter plate such that an open space is provided between the first filter plate and the head plate, the open space defining the head plate liquid removal chamber;

forming the end plate to comprise a raised lip to insert the second filter plate such that an open space is provided between the second filter plate and the end plate, the open space defining the end plate liquid removal chamber;

forming the slurry plate to comprise a central portion with the substantially spiraling paths, the central portion rimmed with a narrow outside portion;

forming the head plate and the end plate in a manner that the head plate and the end plate will fit over the central portion of the slurry plate, causing the combination of the head plate, the slurry plate, the end plate, the first filter plate, and the second filter plate to form a right rectangular prism; and, passing the cryogenic slurry through the central portion of the slurry plate substantially tangential to the first filter plate and the second filter plate, causing the cryogenic liquid to pass into the head plate liquid removal chamber and the end plate liquid removal chamber and the thickened cryogenic slurry to pass through the thickened slurry path;

whereby the cryogenic slurry is thickened.

2. The method of claim 1, wherein the cryogenically-stable material is selected from the group consisting of sintered ceramics, polytetrafluoroethylene, polychlorotrifluoroethylene, natural diamond, man-made diamond, chemical-vapor deposition diamond, polycrystalline diamond, and combinations thereof.

3. The method of claim 1, wherein optimization of temperature-change induced expansion and contraction of the filter medium comprises decreasing expansion and contraction of the filter medium to prevent damage to the filter medium or increasing expansion and contraction of the filter medium to cause the filter medium to become self-cleaning.

4. The method of claim 1, wherein the filter medium comprises a sparger with openings selected from the group consisting of an effective diameter of at most 25 microns, a hole with a diameter of at most 25 microns, and combinations thereof.

5. The method of claim 1, wherein a portion of the cryogenic slurry flow path and a portion of the liquid discharge path are enclosed perpendicular to the cryogenic slurry flow path and the liquid discharge path by the cryogenically-stable material.

6. The method of claim 5, wherein the cryogenically-stable material is selected from the group consisting of ceramics, polytetrafluoroethylene, polychlorotrifluoroethylene, natural diamond, man-made diamond, chemical-vapor deposition diamond, polycrystalline diamond, and combinations thereof.

7. The method of claim 1, wherein the solid is selected from the group consisting of carbon dioxide, nitrogen oxide, sulfur dioxide, nitrogen dioxide, sulfur trioxide, hydrogen sulfide, hydrogen cyanide, water, hydrocarbons with a freezing point above the temperature of the cryogenic liquid, and combinations thereof.

8. The method of claim 1, wherein the cryogenic liquid comprises any compound or mixture of compounds with a freezing point below the temperature at which the solid melts.

9. The method of claim 1, wherein the cryogenic slurry flow path is provided with a back pressure by a restricted outlet for the thickened slurry.

10. The method of claim 1, wherein the half-pipe of the slurry plate comprises a diameter that varies to provide consistent pressure.

11. The method of claim 1, wherein the cryogenically-stable material is selected from the group consisting of sintered ceramics, polytetrafluoroethylene, polychlorotrifluoroethylene, natural diamond, man-made diamond, chemical-vapor deposition diamond, polycrystalline diamond, and combinations thereof.

12. A method for thickening a cryogenic slurry comprising:

providing a cryogenic slurry flow path, a cryogenic liquid discharge path, and a filter medium between the cryogenic slurry flow path and the cryogenic liquid discharge path, wherein the filter medium comprises a cryogenically-stable material such that adsorption of gases is inhibited, deposition of solids is prevented, and temperature-change induced expansion and contraction of the filter medium is optimized;

feeding the cryogenic slurry, comprising a solid and a cryogenic liquid, into the cryogenic slurry flow path, substantially tangential to the filter medium, causing a portion of the cryogenic liquid to cross the filter medium into the cryogenic liquid discharge path as a cryogenic liquid discharge and the cryogenic slurry to thicken to produce a thickened slurry;

providing a head plate, an even number of slurry plates, one fewer liquid removal plates than the total number of slurry plates, an end plate, and the filter medium, the filter medium comprising a filter plate for each face of each slurry plate, the filter plate for the head plate being a first filter plate, the filter plate for the end plate being a last filter plate, and the filter plates for use between the slurry plates and the liquid removal plates being middle filter plates;

securing the first filter plate between the head plate and a first face of a first slurry plate;

securing the last filter plate between the end plate and a second face of a last slurry plate;

securing the middle filter plates between the liquid removal plates and the slurry plates;

causing the cryogenic slurry flow path to pass through the head plate, the slurry plates, and the liquid removal plates into the end plate, connecting to a thickened slurry flow path in the end plate;

causing the thickened slurry flow path to leave the end plate and pass through the slurry plates, the liquid removal plates, and the head plate;

causing the cryogenic liquid discharge path to begin in the end plate in an end plate liquid removal chamber and to pass through the slurry plates, the liquid removal plates, and the head plate, with additional cryogenic liquid provided to the liquid discharge path from the liquid removal plates by two liquid removal chambers for each of the liquid removal plates, and from the head plate by a head plate liquid removal chamber;

causing the cryogenic slurry flow path in the slurry plates to comprise substantially spiraling paths on the first face of the slurry plates and the second face of the slurry plates, wherein the cryogenic slurry flow path is shaped substantially like a half-pipe, with the open face of the half-pipe facing the filter plates;

providing the head plate with a raised lip to insert the first filter plate such that an open space is provided between the first filter plate and the head plate, the open space defining the head plate liquid removal chamber;

providing the end plate with a raised lip to insert the last filter plate such that an open space is provided between the last filter plate and the end plate, the open space defining the end plate liquid removal chamber;

providing the liquid removal plates with a first face and a second face, each with a raised lip to insert the middle filter plates such that an open space is provided between the middle filter plates and the liquid removal plates, the open spaces comprising the middle liquid removal chambers;

providing the slurry plates with a central portion comprising the substantially spiraling paths, the central portion rimmed with a narrow outside portion;

forming the head plate, the end plate, and the liquid removal plates in a manner that the head plate, the end plate, and the liquid removal plates will fit over the central portion of the slurry plates, causing the combination of the head plate, the slurry plates, the liquid removal plates, the end plate, and the filter plates to form a right rectangular prism; and, passing the cryogenic slurry through the central portion of the slurry plates substantially tangential to the filter plates, causing the cryogenic liquid to pass into the head plate liquid removal chamber, the end plate liquid removal chamber, and the middle liquid removal chambers, and the thickened cryogenic slurry to pass through the thickened slurry path;

whereby the cryogenic slurry is thickened.

13. The method of claim 12, wherein a portion of the cryogenic slurry flow path and a portion of the liquid discharge path are enclosed perpendicular to the cryogenic slurry flow path and the liquid discharge path by the cryogenically-stable material.

14. The method of claim 13, wherein the cryogenically-stable material is selected from the group consisting of ceramics, polytetrafluoroethylene, polychlorotrifluoroethylene, natural diamond, man-made diamond, chemical-vapor deposition diamond, polycrystalline diamond, and combinations thereof.

15. The method of claim 12, wherein the solid is selected from the group consisting of carbon dioxide, nitrogen oxide, sulfur dioxide, nitrogen dioxide, sulfur trioxide, hydrogen sulfide, hydrogen cyanide, water, hydrocarbons with a freezing point above the temperature of the cryogenic liquid, and combinations thereof.

16. The method of claim 12, wherein the half-pipe of the slurry plates comprises a diameter that varies to provide consistent pressure.

17. The method of claim 12, wherein the cryogenically-stable material is selected from the group consisting of sintered ceramics, polytetrafluoroethylene, polychlorotrifluoroethylene, natural diamond, man-made diamond, chemical-vapor deposition diamond, polycrystalline diamond, and combinations thereof.

* * * * *